(12) United States Patent
Holder

(10) Patent No.: US 7,386,111 B2
(45) Date of Patent: Jun. 10, 2008

(54) METHOD AND APPARATUS FOR PLACING A LONG DISTANCE CALL BASED ON A VIRTUAL PHONE NUMBER

(75) Inventor: Louis Holder, Princeton Jct, NJ (US)

(73) Assignee: Vonage Network Inc., Holmdel, NJ (US)

( * ) Notice: Subject to any disclaimer, the term of this patent is extended or adjusted under 35 U.S.C. 154(b) by 383 days.

(21) Appl. No.: 10/774,689

(22) Filed: Feb. 10, 2004

(65) Prior Publication Data

US 2005/0175165 A1  Aug. 11, 2005

(51) Int. Cl.
*H04M 7/00* (2006.01)
*H04L 12/66* (2006.01)

(52) U.S. Cl. ............ 379/221.02; 370/352; 379/221.14; 379/221.15

(58) Field of Classification Search ................ 379/221.01–221.15, 219, 220.01; 370/352–356
See application file for complete search history.

(56) References Cited

U.S. PATENT DOCUMENTS

| | | | |
|---|---|---|---|
| 4,100,377 A | 7/1978 | Flanagan | |
| 4,748,620 A | 5/1988 | Adelmann et al. | |
| 4,782,485 A | 11/1988 | Gollub | |
| 5,018,136 A | 5/1991 | Gollub | |
| 5,339,356 A * | 8/1994 | Ishii | 379/234 |
| 5,444,707 A | 8/1995 | Cerna et al. | |
| 5,452,289 A | 9/1995 | Sharma et al. | |
| 5,526,353 A | 6/1996 | Henley et al. | |
| 5,623,490 A | 4/1997 | Richter et al. | |
| 5,966,427 A | 10/1999 | Shaffer et al. | |
| 5,995,491 A | 11/1999 | Richter et al. | |
| 6,014,437 A | 1/2000 | Acker et al. | |
| 6,067,516 A | 5/2000 | Levay et al. | |
| 6,084,956 A | 7/2000 | Turner et al. | |

(Continued)

FOREIGN PATENT DOCUMENTS

EP    1 526 697 A    4/2005

(Continued)

OTHER PUBLICATIONS

Johnston, A., et al. "SIP Call Flow Examples" IETF Standard-Working-Draft, Internet Engineering Task Force (IETF), CH, vol. sip. No. 4 Apr. 2001, pp. 1-72, XP015027711, ISSN: 000-0004.

(Continued)

*Primary Examiner*—Harry S. Hong

(57) ABSTRACT

A method and apparatus for reducing the cost of long distance phone calls is disclosed. Accordingly, an originating phone network is operatively connected to a first intermediate point, and a receiving phone network is operatively connected to a second intermediate point. Each intermediate point is operatively connected to communicate via a data network. Users on the originating and destination phone networks may communicate based on virtual numbers. The virtual number is preferably within the local calling area of the originating phone network. The first and second intermediate points route calls to any geographic location, regardless of distance, over the data network based on the virtual number. This provides the advantage of allowing a user on the originating phone network to access a user at a distant location for a price that is substantially similar to the price of a local call.

20 Claims, 3 Drawing Sheets

U.S. PATENT DOCUMENTS

| | | |
|---|---|---|
| 6,097,804 A | 8/2000 | Gilbert et al. |
| 6,104,706 A | 8/2000 | Richter et al. |
| 6,115,460 A | 9/2000 | Crowe et al. |
| 6,115,468 A | 9/2000 | De Nicolo |
| 6,118,860 A | 9/2000 | Hillson et al. |
| 6,122,364 A | 9/2000 | Petrunka et al. |
| 6,128,379 A | 10/2000 | Smyk |
| 6,137,869 A | 10/2000 | Voit et al. |
| 6,138,072 A | 10/2000 | Nagai |
| 6,167,042 A | 12/2000 | Garland et al. |
| 6,169,741 B1 | 1/2001 | LeMaire et al. |
| 6,175,565 B1 | 1/2001 | McKinnon et al. |
| 6,178,239 B1 | 1/2001 | Kishinsky et al. |
| 6,185,285 B1 | 2/2001 | Relyea et al. |
| 6,188,762 B1 | 2/2001 | Shooster |
| 6,195,425 B1 | 2/2001 | Farris |
| 6,226,286 B1 | 5/2001 | Danne et al. |
| 6,226,361 B1 | 5/2001 | Koyama |
| 6,243,443 B1 | 6/2001 | Low et al. |
| 6,249,576 B1 | 6/2001 | Sassin et al. |
| 6,266,405 B1 | 7/2001 | Madour et al. |
| 6,272,126 B1 | 8/2001 | Strauss et al. |
| 6,282,281 B1 | 8/2001 | Low |
| 6,282,284 B1 | 8/2001 | Dzonno et al. |
| 6,292,553 B1 | 9/2001 | Fellingham et al. |
| 6,298,064 B1 | 10/2001 | Christie |
| 6,304,572 B1 | 10/2001 | Christie |
| 6,304,637 B1 | 10/2001 | Mirashrafi et al. |
| 6,304,653 B1 | 10/2001 | O'Neal et al. |
| 6,310,941 B1 | 10/2001 | Crutcher et al. |
| 6,311,182 B1 | 10/2001 | Colbath et al. |
| 6,320,951 B1 | 11/2001 | Shtivelman et al. |
| 6,327,572 B1 | 12/2001 | Motron et al. |
| 6,330,317 B1 | 12/2001 | Garfinkel |
| 6,337,899 B1 | 1/2002 | Alcendor et al. |
| 6,343,115 B1 | 1/2002 | Foladare et al. |
| 6,349,132 B1 | 2/2002 | Wesemann et al. |
| 6,351,464 B1 | 2/2002 | Galvin et al. |
| 6,351,526 B1 | 2/2002 | Shaffer et al. |
| 6,366,577 B1 | 4/2002 | Donovan |
| 6,366,661 B1 | 4/2002 | Devillier et al. |
| 6,373,836 B1 | 4/2002 | Deryugin et al. |
| 6,373,936 B1 | 4/2002 | Raniere et al. |
| 6,373,938 B1 | 4/2002 | Palacious et al. |
| 6,385,209 B1 | 5/2002 | Skirmont et al. |
| 6,389,119 B1 | 5/2002 | McBride |
| 6,393,476 B1 | 5/2002 | Barnhouse et al. |
| 6,400,820 B1 | 6/2002 | Edwards et al. |
| 6,404,746 B1 | 6/2002 | Cave et al. |
| 6,404,882 B2 | 6/2002 | Fellner et al. |
| 6,404,884 B1 | 6/2002 | Marwell et al. |
| 6,408,062 B1 | 6/2002 | Cave |
| 6,408,065 B1 | 6/2002 | O'Neal et al. |
| 6,411,697 B1 | 6/2002 | Creamer et al. |
| 6,411,704 B1 | 6/2002 | Pelletier et al. |
| 6,415,269 B1 | 7/2002 | Dinwoodie |
| 6,421,437 B1 | 7/2002 | Slutsman |
| 6,424,707 B1 | 7/2002 | Chatterjee |
| 6,430,175 B1 | 8/2002 | Echols et al. |
| 6,430,176 B1 | 8/2002 | Christie, IV |
| 6,430,289 B1 | 8/2002 | Liffick |
| 6,434,143 B1 | 8/2002 | Donovan |
| 6,442,242 B1 | 8/2002 | McAllister et al. |
| 6,446,127 B1 | 9/2002 | Schuster et al. |
| 6,452,932 B1 | 9/2002 | Christie |
| 6,456,618 B2 | 9/2002 | Kozdon et al. |
| 6,463,052 B1 | 10/2002 | Christie |
| 6,466,570 B1 | 10/2002 | Low et al. |
| 6,470,010 B1 | 10/2002 | Szviatovszki et al. |
| 6,473,429 B1 | 10/2002 | Christie |
| 6,480,484 B2 | 11/2002 | Morton |
| 6,480,581 B1 | 11/2002 | Wu et al. |
| 6,487,200 B1 | 11/2002 | Fraser |
| 6,493,337 B1 | 12/2002 | Stevenson, III |
| 6,493,437 B1 | 12/2002 | Olshansky |
| 6,496,477 B1 | 12/2002 | Perkins et al. |
| 6,504,921 B2 | 1/2003 | Kotik et al. |
| 6,510,219 B1 | 1/2003 | Wellard et al. |
| 6,519,232 B1 | 2/2003 | Becher |
| 6,519,333 B1 | 2/2003 | Malik |
| 6,539,077 B1 | 3/2003 | Ranalli et al. |
| 6,542,589 B1 | 4/2003 | Baskin |
| 6,553,023 B1 | 4/2003 | Yamamiya et al. |
| 6,564,261 B1 | 5/2003 | Gudjonsson et al. |
| 6,567,398 B1 | 5/2003 | Aravamudan et al. |
| 6,567,419 B1 | 5/2003 | Yarlagadda |
| 6,571,212 B1 | 5/2003 | Dent |
| 6,577,712 B2 | 6/2003 | Larsson et al. |
| 6,584,094 B2 | 6/2003 | Maroulis et al. |
| 6,584,098 B1 | 6/2003 | Dutnall |
| 6,584,186 B1 | 6/2003 | Aravamudan et al. |
| 6,584,510 B2 | 6/2003 | Anttila |
| 6,587,836 B1 | 7/2003 | Becar et al. |
| 6,597,685 B2 | 7/2003 | Miloslavsky et al. |
| 6,614,786 B1 | 9/2003 | Byers |
| 6,614,899 B1 | 9/2003 | Sollee et al. |
| 6,621,899 B2 | 9/2003 | Dezonno et al. |
| 6,628,760 B2 | 9/2003 | Mirashrafi et al. |
| 6,633,561 B2 | 10/2003 | Christie |
| 6,650,890 B1 | 11/2003 | Irlam et al. |
| 6,665,294 B2 | 12/2003 | Christie |
| 6,665,389 B1 | 12/2003 | Haste, III |
| 6,665,392 B1 | 12/2003 | Wellner et al. |
| 6,668,055 B2 | 12/2003 | Marwell et al. |
| 6,681,252 B1 | 1/2004 | Schuster et al. |
| 6,690,780 B2 | 2/2004 | Kotik et al. |
| 6,694,007 B2 | 2/2004 | Lang et al. |
| 6,697,475 B1 | 2/2004 | MeLampy et al. |
| 6,707,811 B2 | 3/2004 | Greenberg et al. |
| 6,707,906 B1 | 3/2004 | Ben-Chanoch |
| 6,711,160 B2 | 3/2004 | Chan et al. |
| 6,714,988 B2 | 3/2004 | Takemoto et al. |
| 6,718,031 B2 | 4/2004 | Fellner et al. |
| 6,724,755 B1 | 4/2004 | Kim |
| 6,731,630 B1 | 5/2004 | Schuster et al. |
| 6,731,642 B1 | 5/2004 | Borella et al. |
| 6,731,741 B1 | 5/2004 | Fourcand et al. |
| 6,741,586 B1 | 5/2004 | Schuster et al. |
| 6,748,057 B2 | 6/2004 | Ranalli et al. |
| 6,760,429 B1 | 7/2004 | Hung et al. |
| 6,763,226 B1 | 7/2004 | McZeal, Jr. |
| 6,765,931 B1 | 7/2004 | Rabenko et al. |
| 6,769,020 B2 | 7/2004 | Miyazaki et al. |
| 6,771,637 B1 | 8/2004 | Suzuki et al. |
| 6,775,368 B1 | 8/2004 | Lee et al. |
| 6,778,661 B1 | 8/2004 | Yumoto et al. |
| 6,798,873 B2 | 9/2004 | Vardi et al. |
| 6,819,752 B2 | 11/2004 | Raniere et al. |
| 6,822,945 B2 | 11/2004 | Petrovykh |
| 6,839,359 B2 | 1/2005 | Skirmont et al. |
| 6,839,421 B2 | 1/2005 | Esparza et al. |
| 2001/0005412 A1 | 6/2001 | Light et al. |
| 2001/0005415 A1 | 6/2001 | Grunsted et al. |
| 2001/0014919 A1 | 8/2001 | Tzirin |
| 2002/0007391 A1 | 1/2002 | Suzuki |
| 2002/0049815 A1 | 4/2002 | Dattatri |
| 2002/0049860 A1 | 4/2002 | Koitinen |
| 2002/0055879 A1 | 5/2002 | Wengrovitz et al. |
| 2002/0061100 A1* | 5/2002 | DiCamillo et al. ..... 379/221.02 |
| 2002/0095516 A1 | 7/2002 | Nada |
| 2002/0112073 A1 | 8/2002 | McLampy et al. |
| 2002/0114430 A1 | 8/2002 | Murata |
| 2002/0126818 A1 | 9/2002 | Cai et al. |
| 2002/0129131 A1 | 9/2002 | Yamashita |

| | | |
|---|---|---|
| 2002/0150083 A1 | 10/2002 | Fangman et al. |
| 2002/0191635 A1 | 12/2002 | Chow et al. |
| 2003/0005280 A1 | 1/2003 | Bobde et al. |
| 2003/0041132 A1 | 2/2003 | Lim et al. |
| 2003/0043787 A1 | 3/2003 | Emerson, III. |
| 2003/0053446 A1 | 3/2003 | Kwon |
| 2003/0063714 A1 | 4/2003 | Stumer et al. |
| 2003/0086539 A1 | 5/2003 | McCalmont et al. |
| 2003/0095541 A1 | 5/2003 | Chang et al. |
| 2003/0095542 A1 | 5/2003 | Chang et al. |
| 2003/0108064 A1 | 6/2003 | Bilke et al. |
| 2003/0162526 A1 | 8/2003 | Clarisse et al. |
| 2003/0174695 A1 | 9/2003 | Lautenschlager et al. |
| 2003/0202504 A1 | 10/2003 | Dhara et al. |
| 2004/0028025 A1 | 2/2004 | Chang |
| 2004/0028207 A1 | 2/2004 | Kato |
| 2004/0039938 A1 | 2/2004 | Katz et al. |
| 2004/0057415 A1 | 3/2004 | Colson et al. |
| 2004/0114575 A1 | 6/2004 | Morita et al. |
| 2004/0190711 A1 | 9/2004 | Miyajima |
| 2004/0205209 A1 | 10/2004 | Wengrovitz et al. |
| 2004/0205777 A1 | 10/2004 | Zalenski et al. |
| 2004/0215770 A1 | 10/2004 | Maher, III et al. |
| 2004/0223606 A1 | 11/2004 | Enete et al. |
| 2004/0258021 A1 | 12/2004 | Kashimoto et al. |
| 2004/0258238 A1 | 12/2004 | Wong |
| 2004/0258239 A1 | 12/2004 | Gallant et al. |
| 2005/0018659 A1 | 1/2005 | Gallant et al. |

FOREIGN PATENT DOCUMENTS

| | | |
|---|---|---|
| WO | WO 02/03718 A2 | 1/2002 |

OTHER PUBLICATIONS

Rosenberg, J., et al. "STUN—Simple Traversal of UDP Through Network Address Translators" IETF Standard-Working-Draft, Internet Engineering Task Force (IETF), CH, vol. midcom, No. 3, Oct. 14, 2002, XP015002624, ISSN: 0000-0004.

Mahy, R., et al. "STUN—aware NAT draft-simu-midcom-stun-aware-nat-00.txt" IETF Standard-Working-Draft, Internet Engineering Task Force (IETF), CH, Apr. 10, 2002, XP015005296, ISSN: 0000-0004.

Mahy, R., et al. "Pre-Midcom Requirements for Traversal of NATs for traffic not supported by STUN draft-mahy-midcom-premidcom-relay-reqs-00.txt" IETF Standard-Working-Draft, Internet Engineering Taskforce, IETF, CH, Feb. 2003, XP015004271, ISSN: 0000-0004.

Fineberg, V. "A Practical Architecture for Implementing End-to-End QoS in an IP Network" Communications Magazine, IEEE vol. 40, Issue 1, Jan. 2002 pp. 122-130.

Melvin, H. et al. "Time Synchronization for VoIP Quality of Service", Internet Computing, IEEE vol. 6, Issue 3, May-Jun. 2002 pp. 57-63.

Srisuresh et al., "Middlebox Communication Architecture and Framework," RCF 3303, Internet Engineering Task Force (Aug. 2002), available at http://www.ietf.org/rfc/rfc3303.txt (last accessed Aug. 27, 2007).

Rosenberg et al., "NAT Friendly SIP," Internet Engineering Task Force (Jul. 20, 2001), available at http://tools.ietf.org/html/draft-rosenberg-sip-entfw-02 (last accessed Aug. 27, 2007).

Nadine Abbott, "Alternatives for Providing Routing and Location Information to Support Emergency Calling from IP Enterprises," NENA Technical Information Document, Telecordia Technologies, Oct. 3, 2003, pp. 1-16, XP002323684.

* cited by examiner

METHOD AND APPARATUS FOR PLACING A LONG DISTANCE CALL BASED ON A VIRTUAL PHONE NUMBER

FIELD OF THE INVENTION

The present invention relates to long distance phone calls. More specifically, the present invention relates to a method and apparatus for minimizing the cost of making a long distance phone call.

BACKGROUND OF THE INVENTION

Traditional phone systems include local carriers and long distance carriers. Local carriers connect calls within a given local area, while long distance carriers carry calls between the local carriers. The telephone lines from a home or office connect directly to a wire center, which is often referred to as a central office. The central office has one or more switches, which route or direct telephone calls from one destination to another.

Telephone numbers typically include an area code, and a seven digit telephone number. The seven digit telephone number includes a three digit central office number, and four digit central office extension. The three digit central office number directs calls to a particular central office. Once the call reaches the desired central office, the four digit extension directs the call to a line that is served by that central office. Area codes are typically used for long distance phone calls, as discussed below.

Local telephone calls within a small area are often completed within a single central office. In this configuration, calls within the same area are served by the same central office. The central office connects the incoming call to the destination number. If the area is larger however, communication with a second central office may be necessary. The two central offices are typically connected by a trunk, which is a line between the central offices. The destination receives the call from the first central office and then directs it to the appropriate destination, based on the dialed phone number.

Each area code, as mentioned above, corresponds to a particular group of central offices. When a user dials an area code and then the seven digit telephone number, the central office analyzes the dialed number. If the dialed number is located within the Local Transport and Access Area (LATA), then the call is directed to the appropriate central office. A LATA, or local calling area, is typically a contiguous geographic area. If the dialed number is outside of the LATA, the local central office checks its database to determine which long distance company the user has selected for making the call. The local central office then switches the call to lines that are connected to the long distance company's nearest switch, often referred to as a point of presence (POP). Once the long distance company receives the call, it analyzes the phone number and routes the call across the long distance network to the POP that is closest to the called number. That POP routes the call back to a local central office that is near the destination phone, which then completes the call as described above.

The local and long distance companies incur costs for the equipment, switching calls, and maintaining their equipment. All of these costs are eventually passed on to the consumer. Because local calls involve one or two switching stations owned by one company, the costs of a local telephone call are typically low. Typically, a consumer pays a fixed fee for a unlimited amount of local calls. However, because long distance calls are transferred from the local telephone company, to a long distance carrier, and then back to a local telephone company, the cost of a long distance call is greater than a local call. Typically, long distance calls are charged by the minute. However, rates vary depending on a number of factors, such as the number of switches between the originating and destination numbers and taxes. For example, long distance calls between countries may be higher than long distance calls within a given country.

A continuing need exists for a method and apparatus that is capable of reducing the costs associated with long distance telephone calls.

SUMMARY OF THE INVENTION

In one embodiment, the present invention comprises a method for transmitting information between two or more points. The information that is transmitted can be, for example, a telephone call. The method comprises receiving a virtual number from at least one point on an originating network at a first intermediate point on a computer network. Then, based on the virtual number, a second intermediate point on the computer network is determined. The first and second intermediate points are preferably capable of communicating over the computer network.

Once the second intermediate point is determined, a connection is established between the second intermediate point and a point on the destination network, based on the virtual number that was entered at the originating network. The first and second intermediate points then allow the point on the originating network and the point on the destination network to communicate. That communication can, but does not need to, include converting information from the originating and destination networks into a form suitable for transmission over the computer network.

In this embodiment, the virtual number can include, for example, an area code that is within the local calling area of the point on the originating network. The point on the originating network may, but does not have to be, a telephone. The virtual number is assigned to the first and second intermediate points, which may be servers, to allow communication between the originating point and the destination point based on a call routing table.

In one exemplary embodiment of the present invention, data is preferably transmitted over the computer network based on data packets, and data is preferably transmitted over the originating and destination networks by transmitting analog signals. In order to allow the originating user and the destination user to communicate, the first and second intermediate points are preferably capable of converting analog signals into digital data that can be put into data packets, and vice versa.

In another exemplary embodiment, the present invention comprises an apparatus for transmitting information between at least two points. The apparatus includes at least one point on an originating network that is capable of communicating with a first intermediate point based on at least one virtual number. Also included is at least one point on a destination network capable of communicating with a second intermediate point based on the virtual number.

In one embodiment, the point on the originating network and the point on the destination network are preferably telephones and the first and second intermediate points may be servers. A computer network is operatively connected to the first and second server to allow the telephones to communicate. The servers are preferably capable of converting information from the telephones into a form suitable for transmission over the computer network.

In this embodiment, the virtual number can include, for example, an area code that is within the local calling area of the originating telephone. The virtual number is assigned to the first and second servers to allow communication between the originating and destination telephones. The first and second servers allow this communication based on call routing tables, which are preferably part of the servers.

In one exemplary embodiment of the present invention, data from the telephones is transmitted as analog signals, and data is transmitted over the computer network based on data packets. The servers can, but do not need to, be capable of analog to digital conversion, or digital to analog conversion. This allows data from the telephones to be transmitted over the computer network as digital data in the form of, for example, data packets.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

Figure 1:
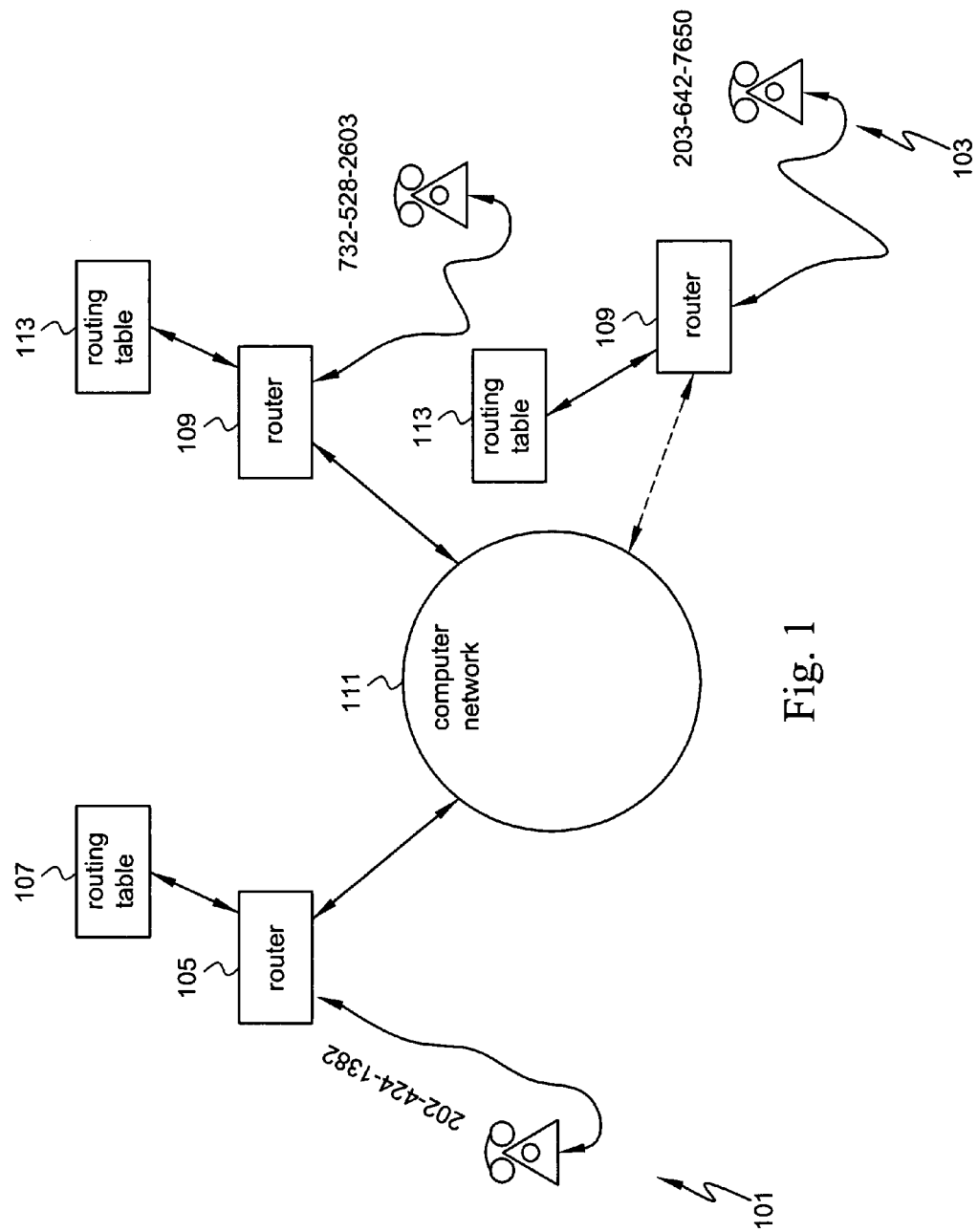
FIG. 1 is a block diagram showing an overview of an exemplary system according to an embodiment of the present invention.

Increasingly, phone companies are using computer networks such as the Internet, to transport long distance calls from one destination to another. Transferring voice calls over a data network is typically accomplished by converting analog voice signals into data packets. This is typically, but not necessarily, accomplished using an industry standard known as Voice over Internet Protocol (VoIP). Transporting calls over computer networks allows local phone companies to bypass long distance carriers. Additionally, because computer network infrastructures are already in place, the cost of transporting calls over computer networks is greatly minimized.

The present invention provides a method and apparatus for minimizing the cost of a long distance call by transporting voice traffic over computer networks. In one embodiment, the present invention comprises a method and apparatus for transmitting voice information between originating and destination points. The originating and destination points may include, but are not limited to, telephones, fax machines, pagers, computers, two way radios, cellular telephones, or telephones operatively connected to the public switched telephone network (PSTN). In a preferred embodiment, the originating and destination points are telephones operatively connected to the PSTN.

The two telephones can be, but do not have to be, operatively connected to separate networks, and each network is operatively connected to its own intermediate point. The intermediate points, which are preferably operatively connected by a computer network, allow the two telephone users to communicate based on the virtual number that is entered by the user of the originating telephone.

The area code of the virtual number is preferably within the local calling area of the originating telephone. In an exemplary embodiment, each virtual number is assigned to a destination telephone. The assignment information is stored in a memory, and can be referenced to determine which destination telephone number a virtual number is assigned to. The memory may, but does not have to be, operatively connected to the two intermediate points. Operatively connecting a memory to each of the two intermediate points allows the delay between receiving a number and determining its destination to be minimized.

In an exemplary embodiment, when a virtual number is received by a first intermediate point, the call may be routed from the first intermediate point to a second intermediate point that is within the local calling area of the destination telephone. The second intermediate point then directs the call to the destination telephone. The two intermediate points can direct a call to any destination number, regardless of the distance between the two telephones. This allows a user to access a long distance telephone using only a local virtual phone number, and provides the advantage of reducing the cost of the call.

Information may be transmitted on the originating and destination networks in any manner known to those skilled in the art. This may include, but is not limited to, information in analog or digital format. Additionally, any type of information may be transmitted between the two points on the originating and destination networks. This may include, but is not limited to, voice, data, or facsimile transmissions.

In one embodiment, the present invention comprises a set of routers distributed at different geographical areas. Each router is operatively connected to a computer network such that they are capable of communicating with each other. Each of the routers are preferably operatively connected to one or more originating or destination networks to receive and process telephone calls.

The router is preferably capable of providing an interface between a central office and the computer network. This may include, but is not limited to, converting data into a format capable of transmission over the computer network. In one embodiment, the router may comprise any computing device known to those skilled in the art. For example, in some embodiments the router may comprise a processor, such as a computer. Alternately, the router may comprise a router that is modified to interpret phone numbers and convert voice signals into data packets. In other embodiments, the router may comprise a server, or proxy server.

In one embodiment, the router receives and interpret a virtual phone number transmitted from an originating network. After processing a phone number to determine its destination, the router connects to another router that is connected to the destination network. Once a connection is established between the originating and destination routers, the originating router converts the voice data into data packets using a desired protocol, for example, VoIP or VoP. Preferably, the process of converting the voice signals into data packets is performed on a real-time, continuous basis. Each router can also be capable of converting the data packets back into voice data on a real-time, continuous basis. Such conversion, however, need not be performed by the router.

Data conversion on a real-time, continuous basis allows data to be transmitted between the originating and destination networks and the computer network with a substantially minimal amount of delay. This provides the advantage of allowing the originating and destination user to communicate with substantially minimal audible distortion. This also allows the two users to communicate over long distances while minimizing the cost of the call.

In one embodiment, a virtual phone number is assigned to a phone number on the destination network ("physical number"). The virtual phone number is assigned to a local router, such as a proxy server. This may be done by updating the memory that stores the virtual numbers and the physical number that they are assigned to. Each virtual phone number serves as a alias for, and directs calls to, a destination physical number. The virtual phone number does not exist on any physical device on the originating or destination network. Thus, calls do not have to be routed through any physical device on the originating or destination networks, which reduces the complexity and costs of routing a call.

FIG. 1 is a block diagram showing an overview of an exemplary system according to an embodiment of the present invention. As shown in FIG. 1, user 101 places a call to user 103. In order to do so, user 101 dials the virtual number that is assigned to the physical number of user 103. As shown in FIG. 1, user 101 dials the number, "202-424-1382." This is a local call for user 101, and allows the user 101 to access router 105. In order to direct the phone call to the appropriate destination, router 105 communicates with a routing table 107. Preferably, routing table 107 is included in router 105. However, in some embodiments it may be a separate element, or part of another element can communicate with router 105.

The router 105 communicates with the routing table 107 to determine which call router 109 the virtual phone number "202-424-1382" corresponds to. In this exemplary embodiment, the routing table includes the physical number that is assigned to the virtual number and information that instructs router 105 to connect to a second router 109. The routing table determines which router 109 to connect to based on the proximity of router 109 to user 103. The router 109 that is chosen is preferably within the local calling area of user 103, and may be positioned closest to user 103.

Once this is determined, router 105 transfers the call to router 109 via a computer network 111. When the call is transferred from router 105 to router 109, the virtual numbers, or its equivalents, are included in the transmitted information. When the call reaches router 109, the router 109 communicates with the routing table 113 to determine what destination number the virtual number is assigned to. Based on this communication, router 109 determines that the destination phone number is "732-528-2603," which corresponds with user 103. A connection is then established between router 109 and user 103. The connection may include, but is not limited to, a connection via, for example, the Internet protocol. Once the connection is established, user 101 and user 103 can communicate without incurring typical long distance charges.

Figure 2:
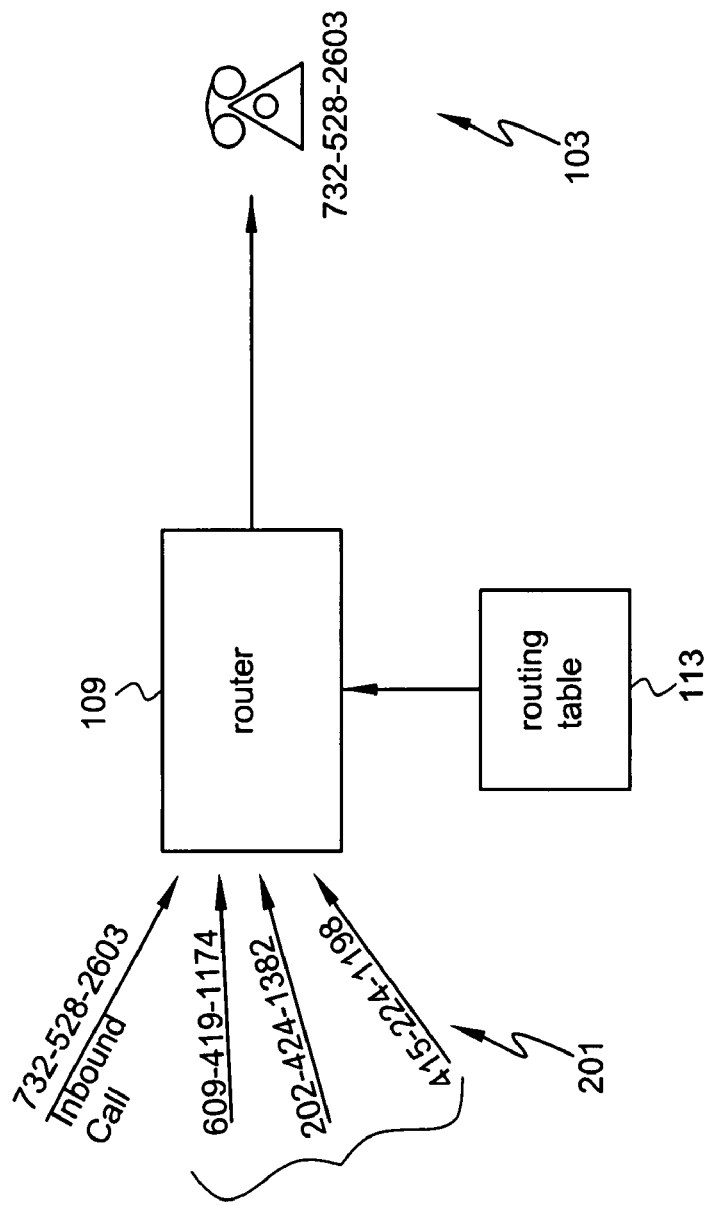
FIG. 2 is a diagram showing an exemplary embodiment of the present invention.

FIG. 2 is a diagram showing an exemplary embodiment of the present invention. As shown in FIGS. 1 and 2, multiple virtual numbers 201 may be assigned to a physical number. In this embodiment, each router 105 in a different geographical area may have a different virtual number. Alternately, each router 105 may be accessed using a plurality of virtual numbers. Each virtual number preferably allows an originating user 101 to dial a number within their local area code in order to access a single destination user 103. This provides the advantage of allowing users in different geographical locations to communicate with user 103 while only dialing a local number. In this embodiment, the multiple users 101 may communicate with user 103 simultaneously or independently.

Figure 3:
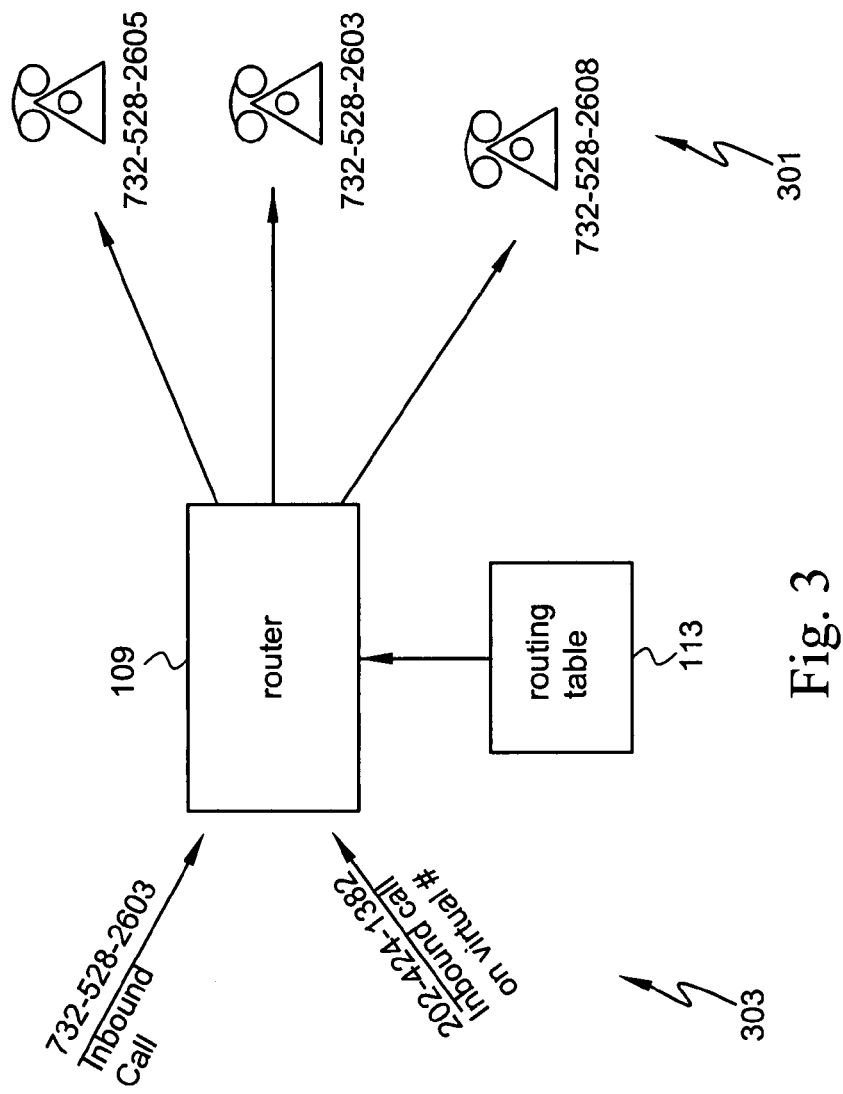
FIG. 3 is a diagram showing another exemplary embodiment of the present invention.

FIG. 3 is a diagram showing another exemplary embodiment of the present invention. In this embodiment, one or more virtual numbers may be assigned to multiple physical numbers 301. In other words, a virtual number may be used to call more than one physical number 301. The calls may be directed to their assigned physical number 301 in any desired manner, as described below.

In one embodiment the virtual number may be assigned such that the server 109 rings the physical devices 301 all at once, or one at a time. Information regarding the order of routing may be stored in the routing table 113. If all of the devices ring at the same time, then the call is routed to the physical number 301 that answers first. If each phone 301 rings one at a time, the user has the option of rolling over to the next physical number in a random order or sequentially by a predefined order.

A virtual number that is assigned to a physical device may be changed upon a users request. This can be done quickly and with minimal cost by reprogramming the routing table, such as routing table 107 shown in FIG. 1. Preferably, this change can be done with minimal manual intervention. However, in some embodiments a router may be reprogrammed manually.

Although the present invention has been described with reference to particular embodiments, it will be understood to those skilled in the art that the invention is capable of a variety of alternative embodiments within the spirit of the appended claims.

The invention claimed is:

1. A method for transmitting information between two or more points, comprising:
    receiving a virtual number at a first intermediate point from at least one originating point, the first intermediate point operatively connected to a packet-based network;
    converting the virtual number into at least one physical number;
    determining a second intermediate point based on the at least one physical number, the second intermediate point operatively connected to the packet-based network;
    determining at least one destination point based on the at least one physical number; and
    transmitting information between the at least one originating point and the at least one destination point.

2. The method according to claim 1, wherein the receiving comprises establishing a communication path between the first intermediate point and the at least one originating point.

3. The method according to claim 1, wherein the converting comprises comparing the virtual number to a routing table.

4. The method according to claim 1, wherein the determining a second intermediate point comprises establishing a communication path between the first intermediate point and the second intermediate point.

5. The method according to claim 1, wherein the determining at least one destination point comprises establishing a communication path between the at least one destination point and the second intermediate point.

6. An apparatus for transmitting information between at least two points, comprising:
    a first intermediate point operatively connected to at least one originating point to receive a virtual number, wherein the virtual number is converted into at least one physical number;
    a second intermediate point capable of communicating with the first intermediate point over a computer network;
    at least one destination point operatively connected to the second intermediate point, wherein the second intermediate point is determined based on its proximity to the at least one destination point.

7. The apparatus according to claim 6, wherein the virtual number comprises an area code, wherein the area code is within a local calling area of the at least one originating point.

8. The apparatus according to claim 6, wherein information is transmitted over the computer network based on packets.

9. The apparatus according to claim 6, wherein information is transmitted to and from the originating and destination points based on analog signals.

10. The apparatus according to claim 6, wherein the first and second intermediate points are capable of analog to digital conversion and digital to analog conversion.

11. The apparatus according to claim 6, wherein the first and second intermediate points comprise servers.

12. The apparatus according to claim 6, wherein the at least one originating point and the at least one destination point comprise telephones.

13. The apparatus according to claim 6, wherein the virtual number is converted into at least one physical number based on a routing table.

14. The method of claim 1, wherein a plurality of virtual numbers are converted into a single physical number.

15. The method of claim 1, wherein the virtual number is converted into a plurality of physical numbers corresponding to more than one destination point.

16. The method of claim 1, wherein the physical number includes a destination physical number and routing instructions corresponding to the second intermediate point.

17. The method of claim 15, wherein the step of transmitting information includes simultaneously transmitting information between at least one originating point and more than one destination point.

18. The method of claim 15, wherein the step of transmitting information includes sequentially transmitting information between at least one originating point and more than one destination point.

19. The method of claim 1, wherein the at least one destination point is on a local computer network with the first or the second intermediate point.

20. A method for transmitting information between two or more points, comprising:
   receiving a virtual number at a first intermediate point from at least one originating point, the first intermediate point operatively connected to a packet-based network;
   converting the virtual number into at least one physical number;
   determining a second intermediate point using a first routing table at the first intermediate point, the second intermediate point operatively connected to the packet-based network;
   determining at least one destination point using a second routing table at the second intermediate point; and
   transmitting information between the at least one originating point and the at least one destination point.

* * * * *